United States Patent [19]

Komatsuzaki et al.

[11] Patent Number: 4,474,443
[45] Date of Patent: Oct. 2, 1984

[54] FILM FEEDING DEVICE FOR CAMERA

[75] Inventors: Hiroshi Komatsuzaki; Jiro Sekine; Shigeo Nakayama; Masashi Takamura; Hiroshi Hara; Nobuyuki Kameyama, all of Tokyo, Japan

[73] Assignee: Fuji Photo Film Co. Ltd., Tokyo, Japan

[21] Appl. No.: 358,646

[22] Filed: Mar. 16, 1982

[30] Foreign Application Priority Data

Mar. 17, 1981 [JP] Japan ............................ 56-37696[U]
Apr. 22, 1981 [JP] Japan ............................ 56-58273[U]

[51] Int. Cl.³ ............................................. G03B 1/30
[52] U.S. Cl. ............................... 354/212; 352/183
[58] Field of Search ........................... 354/204-206, 354/212-216; 352/183, 241, 187-190; 226/74-81, 87

[56] References Cited

U.S. PATENT DOCUMENTS 1,927,062  9/1933  Conn ............................. 352/183 X
2,351,999  6/1944  Nerwin ........................... 354/213
2,695,545 11/1954  Evans ........................... 352/183 X
3,938,721  2/1976  Staneck et al. ............... 352/183 X

FOREIGN PATENT DOCUMENTS 2294463  7/1976  France ............................ 352/183
  50349 11/1921  Sweden ........................... 352/183
  18851 of 1911  United Kingdom ............ 352/241

Primary Examiner—John Gonzales
Attorney, Agent, or Firm—Pasquale A. Razzano

[57] ABSTRACT

A device for feeding a film from a patrone in a camera, in which the film is fed by an endless caterpillar belt having pawls for engaging with film perforations. The caterpillar belt is positioned in a camera so as to match the film perforations between two film guides of the camera and is extended parallel to the film feeding direction. The caterpillar belt is driven by a set of a driving pulley and a driven pulley. The section of the pawls, taken along the film plane, is shaped to have a circular arc contour so as to contact only with the vicinity of the central portion of each film perforation.

12 Claims, 10 Drawing Figures

FILM FEEDING DEVICE FOR CAMERA

BACKGROUND OF THE INVENTION

1. Field of the Invention

This invention relates to an improvement of a film feeding device in a camera in which a film in a patrone is loaded for taking pictures.

2. Description of the Prior Art

In a conventional system of feeding a film with a sprocket, one or two of the teeth of the sprocket are engaged with the film perforations on each side of the film, and the film is fed by rotating the sprocket. Therefore, a shearing force is imparted to the film, and sometimes the film perforations are broken, with the result that the film can no longer be fed. This is a serious drawback in the conventional film feeding system, and especially in an automatic film loading device for a camera. Thus a need exists for a better film feeding system than that of the conventional sprocket system.

Further, in the above-described sprocket system using the conventional engagement members (teeth), as shown in FIG. 8 each sprocket tooth 41 has a rectangular section 44 along the plane of the film 42, like the tooth shape of an involute gear. The sprocket tooth 41 is engaged with a film perforation 43 to move the film 42. Observations of broken films revealed that the perforation 43 broke toward the preceding perforation from the points thereof contacting the corners A and B of the sprocket tooth 41. This presumably occurs because the corners of the perforation 43 cannot easily be deformed and because a stress is exerted on the perforation in such a way that the stress is the maximum at the corners A and B of the engagement member, as shown in FIG. 9. In the case of an automatic film loading device for a camera, the above-mentioned phenomenon tends to occur when the leader section of a film is automatically pulled out of a patrone set in the camera, namely, when the initial film pulling resistance is the maximum. Therefore, even if an excellent patrone setting system is developed, its cannot be utilized to full effect unless something is done to prevent the above-mentioned phenomenon.

SUMMARY OF THE INVENTION

The primary object of the present invention is to provide a film feeding device for use in a camera, which can feed a film in a reliable manner without any risk of breaking the film perforations.

Another object of the present invention is to provide a film feeding device for use in a camera, which is simple in construction and can be manufactured inexpensively.

The specific object of the present invention is to provide a film feeding device for use in a camera, which can reliably feed a film even in an automatic film loading type camera.

The specific feature of the present invention resides in that, instead of the sprocket described above, an endless caterpillar belt with pawls is employed as a film feeding mechanism, to feed a film in a camera.

Further, in the present invention, the shape of the engagement members (pawls) of the caterpillar belt is improved to prevent the film pulling stress from concentrating at the corners of film perforations, thereby to prevent the film from being broken even when a film feeding force higher than that in the conventional system is applied to the film. The improved pawl in accordance with the present invention can be used also for a sprocket or the like, as the feeding member therefor. In this embodiment of the present invention, the pawl of the caterpillar belt has a cross-section having a circular arc contour taken along the film plane so as to contact only with the central portion of the film perforation, as shown in FIG. 10. In FIG. 10, the pawl 45 in accordance with the present invention has a circular contour and comes into point contact with the central portion of the perforation at the beginning of film feeding. The central portion of the perforation is more capable of being deformed than the corner portions thereof because of the elasticity of the film. Therefore, the stress occurring at the central portion is not concentratedly imparted to one central point but is dispersed over the central region. This results in a greatly reduced stress at respective points of the film perforation compared with the stress developing in the case of the above-described conventional sprocket tooth.

DESCRIPTION OF PREFERRED EMBODIMENTS

The present invention will hereinbelow be described in further detail with reference to the accompanying drawings.

Figure 1:
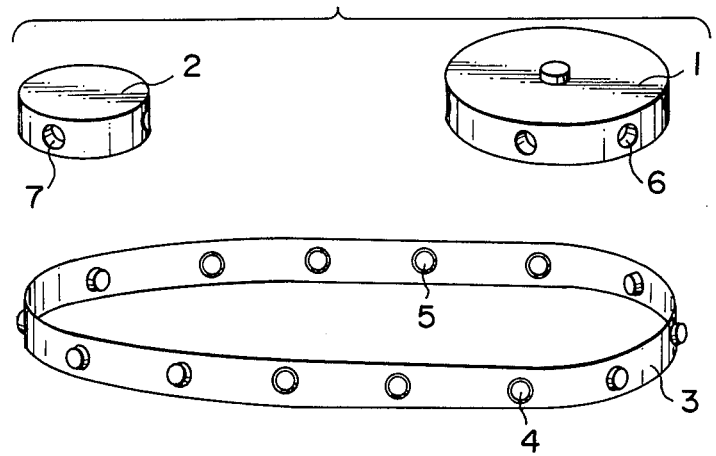
FIG. 1 is a perspective view showing a driving pulley, a driven pulley and a caterpillar belt as separated from one another, which are used in an embodiment of the film feeding device in accordance with the present invention.
Figure 2:
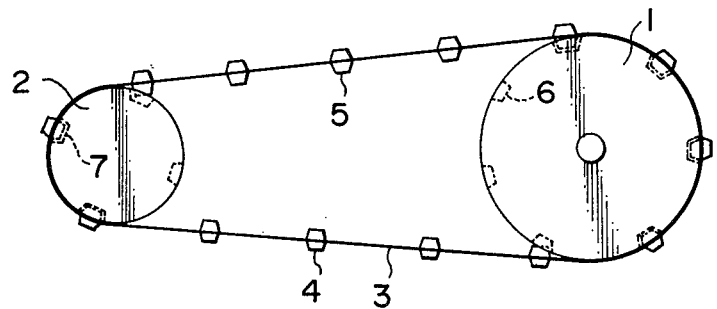
FIG. 2 is a plan view showing the driving pulley, the driven pulley and the caterpillar belt in the assembled condition.
Figure 3:
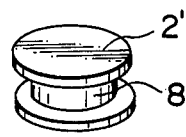
FIG. 3 is a perspective view showing another embodiment of the driven pulley.
Figure 4:
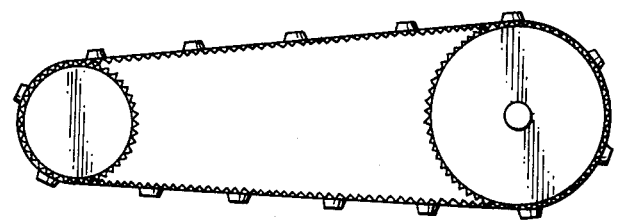
FIG. 4 is an explanatory diagram showing another embodiment of the caterpillar belt drive mechanism.

FIG. 1 is a perspective view of a driving pulley 1, a driven pulley 2 and an endless caterpillar belt 3 with pawls which are separated from one another. FIG. 2 is a plan view showing the driving pulley 1, the driven pulley 2 and the caterpillar belt 3 as assembled with each other. The endless caterpillar belt 3 has film perforation engaging pawls 4 provided at intervals equal to those of film perforations and caterpillar belt drive pulley engaging pawls 5 which engage with the driving pulley 1 and the driven pulley 2. Recesses 6 and 7 are formed in the driving pulley 1 and the driven pulley 2, respectively, so as to engage with the caterpillar belt drive pulley engaging pawls 5. When, the caterpillar belt drive pulley engaging pawls 5 are engaged with the recesses 6 and 7 in the pulleys 1 and 2, the caterpillar belt 3 can be driven by driving the driving pulley 1. Thus, as the film perforation engaging pawls 4 are engaged with the film perforations, the film is fed. The driven pulley 2 may be modified as shown in FIG. 3. The modified driven pulley 2' has a groove 8. Any type of driven pulley may be employed insofar as it can apply tension to the caterpillar belt while positively supporting it. In the above-described embodiment, the driving pulley 1 is larger in size than the driven pulley 2; however, the dimensional relationship between the pulleys 1 and 2 is optional within the limits that they can positively drive the caterpillar belt and can be incorporated in the camera. However, it is preferable for the pulleys 1 and 2 to have the above-described dimensional relationship in order to positively drive the caterpillar belt. Furthermore, although in the above-described caterpillar belt drive mechanism, the caterpillar belt drive pulley engaging pawls 5 are engaged with the recesses 6 in the driving pulley 1, a timing belt and timing belt pulleys as shown in FIG. 4 may be employed instead.

Figure 5:
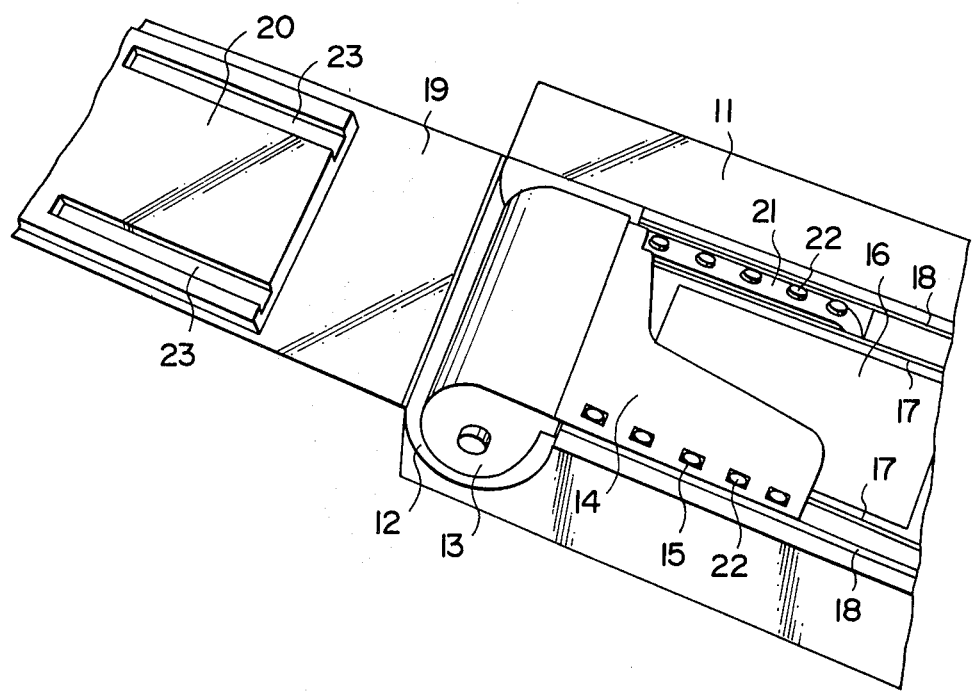
FIG. 5 is a perspective view showing a part of a camera with the rear cover opened, to which the present invention is applied.

FIG. 5 is a perspective view of a part of a camera with the rear cover open, to which the film feeding device according to the present invention is applied. In FIG. 5, reference numeral 11 designates a camera body; 12, a patrone chamber; 13, a film patrone; 14, a film; 15, a film perforation; 16, an exposure frame; 17, inside film guides; 18, outside film guides; 19, a rear cover; 20, a film pressure plate; 21, the film feeding device according to the present invention; 22, a film perforation engaging pawl; and 23, grooves formed in the film pressure plate 20, to permit the film perforation engaging pawls 22 to run freely. A film feeding device is disposed between the inside film guide 17 and the outside film guide 18 on either side of the exposure frame 16 in such a manner that the device confronts the film perforations and the caterpillar belt runs parallel to the film feeding direction, so that it does not interfere with the photographing operation.

In the case of FIG. 5, film feeding devices 21 are provided on both sides so that they confront the film perforation arrays on both sides of the film. However, the film feeding device may be disposed only on one side so that it confronts the film perforation array only on one side of the film. In this case, the film feeding device should be provided on the film leader side to permit ready loading of the film in the camera.

In the above-described embodiment, the film feeding devices are provided on the patrone chamber side of the camera. However, the devices may be provided on the film winding device side of the camera, or they may be provided on the camera rear cover side.

In this embodiment of the present invention, a conventional film winding mechanism can be employed. In rewinding the film, the caterpillar belt driving pulley 1 or 2 in FIG. 1 can be rotated freely by unlocking the film winding mechanism or can be rotated in the opposite direction.

Figure 6:
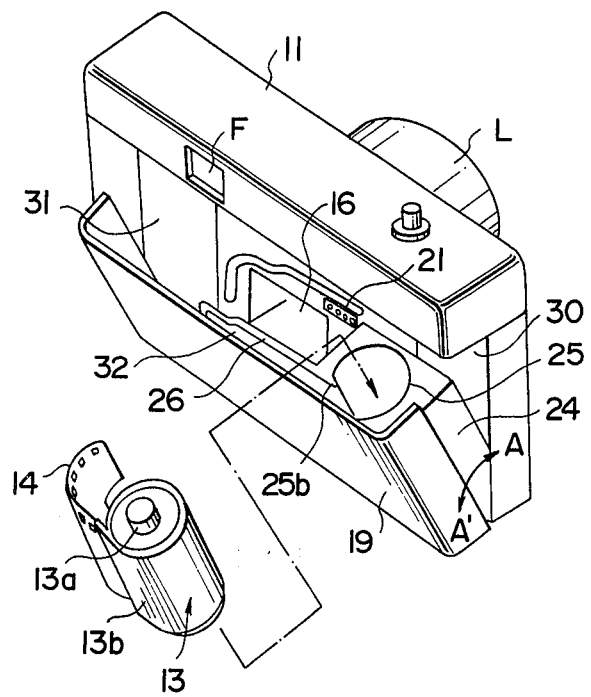
FIG. 6 is a perspective view showing a camera in which another embodiment of the device in accordance with the present invention is employed.
Figure 7:
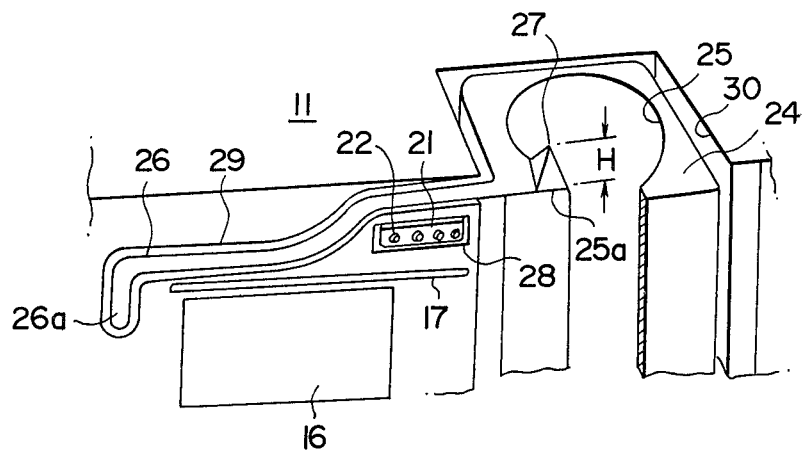
FIG. 7 is a perspective view showing a part of the camera in FIG. 6 with the rear cover removed.

FIG. 6 shows another embodiment of the present invention which is employed for a camera in which a film can be automatically loaded. More specifically, FIG. 6 is a perspective view of the camera with the rear cover opened. FIG. 7 is an explanatory diagram showing a patrone loading member and an exposure frame in the camera with the rear cover removed.

In FIGS. 6 and 7, reference numeral 13 designates a conventional 35 mm patrone; 13a, a patrone shaft; 13b, a film pulling outlet which is slightly protruded in a direction tangential to or substantially tangential to the patrone cylinder; 14, a film leader which has been pulled out from the film pulling outlet 13b by the film manufacturer in advance; 11, a camera body having a lens L, a finder F and other essential photographing means; and 19, a rear cover which can be opened in the direction of the arrow A' and closed in the direction of the arrow A. In the embodiment, the rear cover is rotatably supported by a hinge (not shown) provided at the middle of the bottom of the camera body 11, and is retained at a predetermined angle to expose a patrone loading member 24 (described later). The patrone loading member 24 is provided between the camera body 11 and the rear cover 19. The patrone 13 is dropped into the patrone loading member 24. In the embodiment, the patrone loading member 24 is fixedly secured to the rear cover 19. The patrone loading member 24 is cut as indicated at 25 to form a patrone receiving chamber. A guide slit 32 is provided so that, while a patrone 13 is being inserted into the patrone receiving chamber, the film leader is guided in the camera. In FIG. 6, a patrone loading chamber 30 is provided on the righthand side of an exposure frame 16, and a film winding chamber 31 is provided on the lefthand side of the exposure frame 16. The chambers 30 and 31 may be reversed in location. In the case where the chambers 30 and 31 are arranged as shown in FIG. 6, the user can load or take out the patrone by grasping the patrone shaft 13a, and can suitably lead the film leader 14 into the guide slit 32 by utilizing a cut formed in the film leader.

In the film winding chamber 31, an automatic film winding mechanism (not shown) and a film winding shaft (not shown) are provided.

The patrone loading member 24 has the aforementioned cut 25 on its right side. The cut 25 has a circular arc contour substantially similar to the cross section of the patrone. As shown in FIG. 7, the patrone loading member 24 has a cut at a part 25a of the circular contour, which is extended in the tangential direction of the circular contour, to control or determined the patrone loading orientation. That is, when an indent formed between the film pulling outlet 13b and the cylinder of the patrone 13 is engaged with a part of the circular contour, namely, the protruded portion 25b, the patrone can be loaded and the orientation of the patrone in the patrone receiving chamber is set correctly. The protruded portion 25b may have a top portion 27 which as shown in FIG. 7, is higher by H than the upper surface of the patrone loading member 24. In this case, the patrone can be more smoothly loaded because, when the patrone is loaded from above, it can be slid down the inclined top portion 27. A guide member 26 is provided in a part of the protruded portion 25b in such a manner that it extends in parallel with the film surface and towards the film winding chamber and the film leader guide slit 32 is formed between the guide member 26 and the rear cover 19. With the guide member 26, the film leader can be readily inserted into the slit in loading the patrone 13. Even if the film leader 14 is curled around the outer wall of the patrone 13, as the patrone is dropped with its indent engaged with the protruded portion 25a (25b), the lower edge of the film leader 14 is caused to abut against the upper surface of the guide member 26, as a result of which the film leader is continuously extended along the upper surface and radially of the patrone and is finally inserted into the slit. Thus, the film leader can be readily inserted into the slit guided by the guide member 26.

The guide member 26 extends beyond the exposure frame 16, and its end portion 26a is bent downwardly. A groove 29 is provided beside the exposure frame 16, to receive the guide member 26. The configuration of the groove 29 is similar to that of the guide member 26. An opening 28 is formed between the righthand end portion of the groove 29 and a running rail 17 so that the film feeding device 21 shown in FIGS. 1 and 2 protrudes slightly from the surface on which the running rail is provided. The film feeding device 21 is driven by a motor (not shown) or the like.

When the patrone 13 is loaded, film leader 14 is introduced into the slit 32 and is maintained extended by the guide member 26. When the rear cover 19 is closed, the patrone loading member 24 and the guide member 26 provided on the rear cover are set respectively in the patrone loading chamber 30 and the guide receiving groove 29 which are provided in the camera body, thus causing no hindrance to the running of the film. At the same time, the film leader is pushed against the running rail by the film pressure plate (not shown) on the rear cover, and therefore the perforations in the film leader are engaged with the pawls 22 of the film feeding device.

When, under this condition, the power switch or the shutter button of the camera is operated, the film feeding device is driven to pull the film out of the patrone. When the film leader reaches the film winding chamber 31, it is wound on the film winding shaft by the film winding mechanism.

As is apparent from the above description, when a film is fed with the film feeding device according to the present invention, the pawls can be engaged with a number of perforations of the film and the film can be fed by applying a force in a direction in parallel with the film feeding direction. Therefore, the film can be positively fed with fear of breaking the film perforations.

Where the film feeding device according to the present invention is applied to an automatic film loading type camera as shown in FIGS. 6 and 7, the film can be positively fed. Further, as in the case of the camera shown in FIG. 5, a camera can be manufactured in which a film can be automatically loaded merely by closing the rear cover after the film patrone 13 is set and then the perforations 15 of the film 14 are engaged with the film perforation engaging pawls 22.

Since the film feeding device of the present invention is simple in construction, it can be manufactured at low cost.

Figure 10:
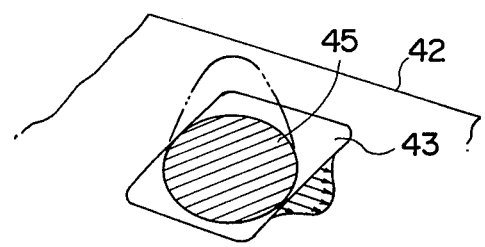
FIG. 10 is an enlarged view showing a perforation engagement pawl in accordance with the present invention, and the stress distribution developing when it engages with a perforation.

FIG. 10 shows an embodiment of the film perforation engagement pawl provided on the caterpillar belt. In FIG. 10, a pawl 45 has a conical shape, and a cross-section having a circular arc contour taken along the film plane 2. The perforation engagement pawl 45 comes into contact with a central point of the perforation at the beginning of film feeding, and the stress occurring at the central point is distributed over the central region because of the elasticity of the film. Therefore, individual points of the film perforation receive only a reduced stress, so that the film does not break even when a film feeding force higher than that in the conventional system is applied thereto. The perforation engagement pawl in accordance with the present invention can be advantageously used in the embodiments of the film feeding device of the present invention shown in FIGS. 1 to 7. However, the perforation engagement pawl may also be applied to a film feeding means such as a sprocket system or the like.

Figure 8:
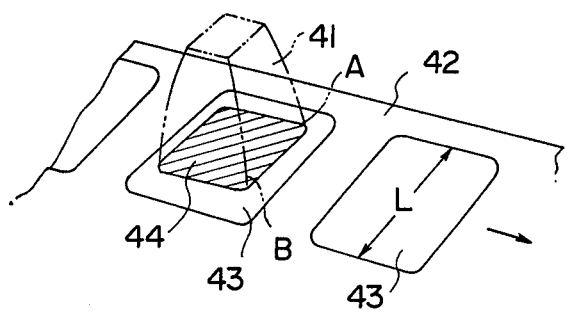
FIG. 8 is a perspective view showing a conventional perforation engagement pawl.
Figure 9:
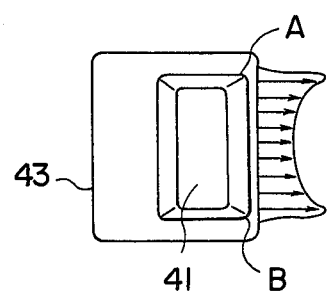
FIG. 9 is an explanatory diagram showing the stress distribution developing when the engagement pawl in FIG. 8 engages with a perforation.

The cross-section of the perforation engagement pawl shown in FIG. 10 may be circular, elliptical, hexagonal or the like, provided that it comes into contact with about one third of the longitudinal dimension L (FIG. 8) of the film perforation at the initial stage of contact. The perforation engagement pawl may be tapered off in the direction perpendicular to the film, like a cone, so as to facilitate engagement with the film perforation. It may also be hemispherical, involute-shaped, or the like.

In experiments conducted by the inventor, eight brass cross-sectionally circular engagement pawls (hemispherical teeth having a diameter of 12.3 mm and a height of 1.6 mm) were formed on a 12.3 mm diameter cylinder. When the thus obtained film feeding means was used to feed a film, the film perforation broke at a force within the range of 1000 to 1100 g at normal temperature (20° C.) and within the range 1000 to 1200 g at a low temperature (−10° C.). Thus the film feeding force possible with the film feeding means in accordance with the present invention is about two times higher than that possible with a conventional eight-tooth sprocket. This indicates that the film feeding means having the perforation engagement pawls in accordance with the present invention can satisfactorily feed a film without breaking it even at the beginning of film feeding.

As described above, the film feeding device using the perforation engagement pawl shown in FIG. 10 can satisfactorily feed a film because a highly concentrated stress is not applied to the film perforation. When the film feeding device is used in an automatic film loading type camera as shown in FIGS. 6 and 7, it can achieve film feeding in a reliable manner without breaking the film perforations. Further, the device in accordance with the present invention is simple in construction and can be manufactured inexpensively.

We claim:

1. In a camera in which a film in a patrone is loaded for taking pictures, wherein said flim is provided with rectangular film perforations along at least one edge thereof, and wherein a film feeding device for feeding said film along a film plane in the camera comprises an endless caterpillar belt, and regularly spaced pawls arranged on said belt and which are situated to be engaged with said film perforations; the improvement wherein the section of each of the pawls taken along the film plane is arcuately shaped so as to contact approximately only with a central region of an edge of a corresponding perforation, such that the stress of the pawl upon said edge of said perforation is greatest at said central region and decreases towards the corners of the perforation.

2. A device as defined in claim 1 wherein said caterpillar belt is positioned in such a manner that it confronts film perforations between two film guides in said camera and is extended in a direction parallel to the film feeding direction, whereby it does not interfere with the photographing operation.

3. A device as defined in claim 1 wherein said caterpillar belt is driven by a set of a driving pulley and a driven pulley.

4. A device as defined in claim 3 wherein said caterpillar belt has caterpillar belt drive pulley engaging pawls, and said driving pulley has recesses to engage with said caterpillar belt drive pulley engaging pawls.

5. A device as defined in claim 4 wherein said driven pulley has recesses to engage with said caterpillar belt drive pulley engaging pawls.

6. A device as defined in claim 4 wherein said driven pulley has a groove around its periphery to support said caterpillar belt.

7. A device as defined in claim 3, wherein said caterpillar belt is in the form of a timing belt to engage with said driving pulley, the latter being formed as a timing belt pulley, with the timing belt and timing belt pulley having cooperatively engaging means thereon to ensure non-slippable engagement.

8. A device as defined in claim 7, wherein said driven pulley is also formed as a timing belt pulley.

9. A device as defined in claim 1 wherein said flim has respective rows of perforations at two edges thereof and said device is provided with two said caterpillar belts and associated pawls each said belt being disposed along a respective edge of the film with the associated pawls being arranged to match the respective rows of film perforations.

10. A device as defined in claim 1 wherein said device is provided on the patrone chamber side of a camera.

11. A device as defined in claim 1 wherein said pawls are tapered in the direction perpendicular to said film.

12. In a camera in which a film in a petrone is loaded for taking pictures, wherein said film is provided with rectangular film perforations along at least one edge thereof, and wherein a film feeding device for feeding said film along a film plane in a camera comprises an endless caterpillar belt, and regularly spaced pawls arranged on said belt and which are situated to be engaged with said film perforation; the improvement wherein the section of each of the pawls taken along the film plane is shaped so as to contact approximately only with a central region of an edge of a corresponding perforation, and wherein said section of each of said pawls is shaped to have a circular arc contour.

* * * * *